US005585408A

United States Patent [19]
Harris et al.

[11] Patent Number: 5,585,408
[45] Date of Patent: Dec. 17, 1996

[54] CROSSLINKED SEEDED COPOLYMER BEADS AND PROCESS OF MANUFACTURE

[75] Inventors: William I. Harris; Robert L. Sammler, both of Midland, Mich.

[73] Assignee: The Dow Chemical Company, Midland, Mich.

[21] Appl. No.: 476,529

[22] Filed: Jun. 7, 1995

Related U.S. Application Data

[62] Division of Ser. No. 330,039, Oct. 27, 1994.

[51] Int. Cl.⁶ .................. C08F 8/38; C08F 8/34; C08F 8/56
[52] U.S. Cl. .................. 521/33; 521/25; 521/30; 525/344; 525/353; 525/360
[58] Field of Search .................. 521/30, 33, 31, 521/38

[56] References Cited

U.S. PATENT DOCUMENTS

| | | |
|---|---|---|
| 4,177,331 | 12/1979 | Amick . |
| 4,263,407 | 4/1981 | Reed, Jr. . |
| 4,419,245 | 12/1983 | Barrett et al. . |
| 4,486,313 | 12/1984 | Meitzner .................. 210/681 |
| 4,564,644 | 1/1986 | Harris . |
| 4,698,394 | 10/1987 | Wong . |
| 4,708,994 | 11/1987 | Wong . |
| 4,950,332 | 8/1990 | Stringfield et al. . |
| 5,068,255 | 11/1991 | Harris .................. 521/28 |
| 5,231,115 | 7/1993 | Harris .................. 521/28 |
| 5,310,809 | 5/1994 | Pabon, Jr. .................. 525/289 |

OTHER PUBLICATIONS

D. H. Freeman, "Homogeneous Sulfonation of Styrene–Divinylbenzene Copolymers with Oleum in Organic Solvents", *Israel Journal of Chemistry*, vol. 7, 1969, pp. 741–749.

S. Goldstein and G. Schmuckler, "Sulfone Formation During the Sulfonation of Crosslinked Polystyrene", *Ion Exchange and Membranes*, vol. 1, 1972, pp. 63–66.

F. Helfferich, "Ion Exchange", (1962) 53 (New York) McGraw Hill.

*Primary Examiner*—Fred Zitomer

[57] ABSTRACT

Seeded cation-exchange resin beads are particularly susceptible to oxidative degradation which results in the leaching of organic carbon fragments. The leachability of organic carbon fragments of molecular weights greater than 1000 g/mol is reduced to less than 800 ppm by effectively crosslinking the copolymers that comprise the seeded cation-exchange in beads Crosslinking can be achieved either during sulfonation by increasing sulfone bridge formation or before sulfonation by either alkylene bridge formation or by incorporation and subsequent activation of a crosslinkable functionality in the copolymer that forms the seed in the seeded polymer bead process.

11 Claims, No Drawings

CROSSLINKED SEEDED COPOLYMER BEADS AND PROCESS OF MANUFACTURE

CROSS-REFERENCE TO RELATED APPLICATION

This application is a divisional of application Ser. No. 08/330,039 filed Oct. 27, 1994.

FIELD OF THE INVENTION

This invention generally concerns the production of polymer beads useful in the manufacture of ion-exchange resins. More particularly, this invention concerns a process for augmenting the crosslinking level of seeded copolymer beads after the monomer imbibition or grow-up step. This additional crosslinking or post-crosslinking is key to improved resistance to oxidation and leaching after functionalization into cation-exchange resins. Crosslinking procedures include activation of crosslinkable monomers, sulfone-bridge formation, and alkylene-bridge formation.

This invention also particularly concerns crosslinked seeded copolymer beads in the form of cation-exchange resins and a process for their manufacture. When some methods, such as sulfone-bridge formation, are used to crosslink the copolymers of the polymer matrix in the process described above, the copolymers are functionalized with sulfonic acid groups during crosslinking, and the resulting crosslinked seeded copolymer beads are cation-exchange resin beads. Alternatively, the seeded copolymer beads are functionalized after crosslinking to form cation-exchange resin beads. The crosslinked seeded cation-exchange resin beads of this invention demonstrate improved resistance to oxidation and to leaching.

BACKGROUND OF THE INVENTION

Most ion-exchange resins are produced by chemically attaching ion-exchange functional groups to crosslinked polymer beads. The utility of an ion-exchange resin depends to a large extent on the physical properties of the polymer beads used, such as the uniformity of bead size and the extent of crosslinking. The extent of crosslinking in a polymer bead can strongly affect the pore size, crush strength, and susceptibility to oxidation of the resin produced from that bead. Susceptibility to oxidation is generally a problem in cation-exchange resins, but not in anion-exchange resins. The functional groups in anion-exchange resins are more susceptible to oxidation than the polymer molecules which form the structural framework of the resins. Thus, the functional groups effectively protect the polymer backbones of anion-exchange resins from oxidative attack. The functional groups of cation-exchange resins, however, offer no such protection. Consequently, cation-exchange resins are particularly susceptible to oxidative cleaving of the polymer backbone and to leaching of the degradative byproducts of that oxidation. For further discussion of oxidation and leaching in cation-exchange resins, see J. R. Stahlbush et.al., "Prediction and Identification of Leachables from Cation-Exchange Resins," *Proceedings of the 48th International Water Conference*, 67–77, 1987. Some methods for improving the oxidative stability of cation-exchange resins are described in the literature, e.g., U.S. Pat. No. 4,973,607 in which cation-exchange resins are treated with an antioxidant or U.S. Pat. No. 5,302,623 in which an oxidation-stabilizing moiety is incorporated into the styrenic copolymer backbone.

Suspension polymerization is the traditional method used to manufacture polymer beads for ion-exchange resins. In suspension polymerization, monomers are introduced into a reactor containing an aqueous solution, where they are formed into droplets by mechanical agitation. The monomers are then polymerized to form polymer beads. The size and size distribution of the beads produced in this manner depend on a variety of factors, including the rate of agitation, the type of suspending agent, and the amount of monomer used compared to the amount of aqueous solution used. For a good general discussion of suspension polymerization, see H. F. Mark et.al., *Encyclopedia of Polymer Science and Engineering*, 2nd ed., John Wiley & Sons, 16, 443–471 (1989).

Many methods for crosslinking the polymer beads produced by suspension polymerization are known. The literature describes methods for crosslinking such beads during polymerization, after polymerization or both. Crosslinking is accomplished during polymerization by using a mixture of monomers which includes a crosslinker such as a polyvinyl aromatic monomer. Mixtures of styrene and divinylbenzene are commonly used for this purpose; see, for example, U.S. Pat. No. 3,792,029. The literature also describes methods for increasing the amount of crosslinking in a lightly crosslinked copolymer bead by post-crosslinking after the initial copolymerization. Alkylene bridge formation is one such method which has been employed to post-crosslink lightly crosslinked copolymer beads; see, for example, U.S. Pat. Nos. 4,263,407 and 4,950,332. Finally, the literature describes methods for crosslinking beads of linear polymer chains, such as those produced by suspension polymerization of styrene. U.S. Pat. No. 4,177,331 describes a process for sulfone-crosslinking linear polystyrene beads. In summary, a wide variety of methods are known for obtaining crosslinked polymer beads suitable for functionalization to produce cation- or anion-exchange resins.

However, polymer beads produced by conventional suspension polymerization are not ideal raw materials for ion-exchange resin production, due to a general lack of uniformity in bead size. This lack of size uniformity can adversely affect the performance of an ion-exchange resin produced from such beads. U.S. Pat. No. 5,081,160 discusses the effect of non-uniformity in bead size on ion-exchange resin performance. In general, smaller resin beads have shorter diffusion paths resulting in improved exchange kinetics when compared to larger resin beads. But, smaller beads also tend to increase the pressure drop across a resin bed limiting the amount of liquids that can be processed. The availability of resin beads of fairly uniform size allows for the use of generally smaller beads with their desirable exchange kinetics without otherwise contributing toward unacceptably high pressure drops. Uniform-size ion-exchange resins, therefore, tend to have superior properties in comparison to resins with non-uniform size distributions.

Greater uniformity in bead size can be economically obtained by using a seeded process for polymer bead formation, rather than a traditional batch suspension polymerization process. In a seeded process, one starts with lightly crosslinked or uncrosslinked polymer seed beads of relatively uniform size produced by a suspension polymerization process. The seed beads are then imbibed with a monomer mixture containing both vinyl aromatic monomer and polyvinyl aromatic monomer, and the imbibed monomers polymerized to form seeded copolymer beads; see, for example, U.S. Pat. No. 4,419,245. Additional monomer mixture can also be added to the seeded copolymer beads intermittently or continuously during the polymerization; see, for example, U.S. Pat. No. 4,564,644.

Seeded copolymer beads produced by any one of the methods described above can be functionalized to produce either cation- or anion-exchange resins. However, such beads have been found to be of limited utility in cation-exchange resin production because of their high susceptibility to oxidation and leaching. Cation-exchange resins today, therefore, continue to be produced primarily from polymer beads manufactured by traditional suspension polymerization rather than by seeded methods. However, while functionalized polymer beads produced by suspension polymerization do not generally exhibit the same problems with oxidation and leaching exhibited by functionalized seeded beads, they do tend to lack size uniformity. What is needed is a method of modifying seeded polymer beads in such a way that cation-exchange resins made from those beads have a high amount of resistance to oxidation and leaching.

Some sulfone bridges are known to form between the polymer molecules of a polystyrene bead during the standard sulfonation process used to functionalize a polymer bead to convert it into a cation-exchange resin. Sulfone crosslinks were found to form during sulfonation of polystyrene beads when either oleum, sulfur trioxide or chlorosulfonic acid are used in the sulfonation reaction; see, for example, A. S. Goldstein, "Sulfone Formation During Sulfonation of Crosslinked Polystyrene," *Ion Exchange & Membranes*, 1, 63–66 (1972). However, the number of sulfone crosslinks formed between polymer molecules is minimal in a standard sulfonation process. In fact, the literature recommends choosing sulfonation conditions which minimize the formation of sulfone bridges when functionalizing polymer beads; see, for example, Goldstein, supra, or D. H. Freeman et.al., "Homogeneous Sulfonation of Styrene-Divinylbenzene Copolymers with Oleum in Organic Solvents," *IsraelJournal of Chemistry*, 7, 741–749 (1969). Sulfone bridges are portrayed as the products of an undesirable side reaction, a side reaction which reduces the number of sulfonate or sulfonic acid functional groups available for ion-exchange.

Copolymers of styrene and vinylbenzocyclobutene are known to form crosslinks with one another when thermally activated; see, for example, U.S. Pat. No. 4,698,394.

Lastly, in U.S. Pat. Nos. 4,263,407 and 4,950,332, polymeric adsorbents exhibiting improved porosity and adsorption characteristics are produced from lightly-crosslinked macroreticular aromatic copolymer beads by post-crosslinking the copolymer beads while in a swollen state. The post-crosslinking is accomplished by reacting the polymer with polyfunctional alkylating agents, polyfunctional acylating agents or sulfur halides in the presence of a Friedel-Crafts catalyst in either a single or consecutive reactions.

SUMMARY OF THE INVENTION

The present invention concerns crosslinked seeded copolymer beads and a method for producing such beads. The method of the present invention comprises the steps of: (a) imbibing polymer seed beads of a first copolymer comprised of a first monovinyl aromatic monomer and a first polyvinyl aromatic monomer wherein the concentration of the polyvinyl aromatic monomer is less than about 3.0 percent by weight of the total amount of monomer in the first copolymer, with a monomer mixture comprising a second monovinyl aromatic monomer, a second polyvinyl aromatic monomer, and a free-radical initiator, (b) forming a polymer matrix comprising the first copolymer and a second copolymer, wherein the second copolymer is formed by free-radical polymerization of the monomer mixture imbibed in the polymer seed beads, and (c) crosslinking the copolymers of the polymer matrix to form crosslinked seeded copolymer beads. In another aspect of the invention, the polymer matrix can additionally be comprised of a third copolymer. The third copolymer is added to the matrix formed by the first and second copolymers by imbibing the matrix with a reaction mixture comprising a third monovinyl aromatic monomer and a third polyvinyl aromatic monomer followed by free-radical polymerization of the mixture.

In a further aspect of the invention, the crosslinking of the copolymers of the polymer matrix is done by one or more of the following procedures: incorporation of a crosslinkable monovinyl aromatic monomer into the first copolymer, i.e., the seed beads, followed by activation of the crosslinkable moiety during free-radical polymerization of the monomer mixture imbibed into the polymer seed beads; formation of sulfone bridges between the copolymers of the polymer matrix; and formation of alkylene bridges between the copolymers of the polymer matrix.

An additional aspect concerns the crosslinked seeded copolymers which are prepared by the method of this invention and the cation-exchange resin beads produced from the crosslinked seeded copolymer beads by the addition of a strong acid either during or after crosslinking. Such beads have a leachability index of less than 800 ppm total organic carbon (TOC) of molecular weight (MW) greater than 1000 grams per mole (g/mol). The crosslinked seeded cation-exchange resin beads of this invention have high resistance to oxidation and to leaching.

DETAILED DESCRIPTION OF THE INVENTION

In order to most fully benefit from the advantages offered by the present invention, the polymer seed beads which provide the starting material for the invention must be of uniform bead size. The initial uniformity in seed bead size is obtained generally by either physically screening the seed beads or by using a process which produces seed beads of fairly uniform size, such as the procedures taught in European Patent Application Publication Nos. 0 005 619 and 0 051 210.

The polymer seed beads are comprised of a first monovinyl aromatic monomer and a first polyvinyl aromatic monomer, with the concentration of the polyvinyl aromatic monomer not exceeding 3 weight percent of the total monomer weight. While the seed beads are preferably microporous, i.e., gellular in nature, lightly-crosslinked macroporous beads can also be used as seeds.

Seed beads are typically from about 10 to about 750 micrometers (µm) in diameter, most preferably of from 100 to 500 µm.

Monovinyl aromatic monomers suitable for use in the polymer seed beads include styrene, alkylstyrenes such as vinyltoluene and ethyl vinylbenzene, vinylbenzyl chloride, vinyl naphthalene or mixtures thereof. Also suitable are crosslinkable monovinyl aromatic monomers such as vinylbenzocyclobutene and its derivatives which provide an effective mechanism for crosslinking after monomer imbibition or during seed growup. The preferred monovinyl aromatic monomers for use in the polymer seed beads are styrene, ethyl vinylbenzene, vinylbenzocyclobutene or mixtures thereof.

Polyvinyl aromatic monomers suitable for use in the polymer seed beads include divinylbenzene, divinyltoluene, divinylnaphthalene, trivinylbenzene, divinyl diphenyl ether and the like. Divinylbenzene is preferred.

The polymer seed beads, which consist of the first copolymer, are imbibed with a monomer mixture comprising a second monovinyl aromatic monomer, a second polyvinyl aromatic monomer and a free-radical initiator.

Second monovinyl aromatic monomers suitable for use in the monomer mixture with which the seed beads are imbibed include styrene, alkylstyrenes such as vinyltoluene and ethylvinylbenzene, vinylbenzyl chloride, vinyl naphthalene or mixtures thereof. The preferred second monovinyl aromatic monomers are styrene, ethyl vinylbenzene or mixtures thereof.

Second polyvinyl aromatic monomers suitable for use in the monomer mixture with which the seed beads are imbibed include divinylbenzene, divinyltoluene, divinylnaphthalene, trivinylbenzene, divinyl diphenyl ether and the like. Divinylbenzene is again preferred.

The monomer mixture with which the seed beads are imbibed generally contains from about 3 to about 25, preferably from 5 to 20 weight percent of the second polyvinyl aromatic monomer based on the total weight of the monomer mixture, with the balance being the second monovinyl aromatic monomer.

The free-radical initiators used in this process may be any one or a combination of conventional initiators for generating free radicals in the polymerization of vinyl aromatic monomers. Representative chemical initiators are azo-compounds like azobisisobutyronitrile and peroxygen compounds such as benzoyl peroxide, t-butylperoctoate, t-butylperbenzoate, cumene hydroperoxide, and isopropylpercarbonate. Other suitable initiators are mentioned in U.S. Pat. Nos. 4,192,921, 4,246,386, and 4,283,499. The choice of which initiator or combination of initiators to use may depend on compatibility with the particular monomers to be employed, or on the reactivity of the initiator at the polymerization temperature to be used. For example, t-butylperoctoate, t-butylperbenzoate, and cumene hydroperoxide are all compatible with most types of vinyl aromatic monomers. t-Butylperoctoate and t-butylperbenzoate are good free-radical initiators at temperatures between 80° C. and 110° C. while cumene hydroperoxide is a good free-radical initiator at temperatures above 110° C.

The free-radical initiators are employed in amounts sufficient to induce polymerization of the monomers in a particular monomer mixture. The amount will vary, as those skilled in the art can appreciate, and will depend generally on the type of initiators employed, as well as the type and proportion of monomers being polymerized. Generally, an amount of from about 0.02 to about 2 weight percent is adequate, based on total weight of the monomer mixture. The amount of initiator used is preferably at least 0.05 percent based on the total weight of the monomer mixture, and preferably less than 1 percent.

The monomer mixture with which the seed beads are imbibed may optionally contain a phase-separating diluent; see U.S. Pat. No. 5,231,115. Phase-separating diluents are those which are solvents for the monomers employed, but not solvents for the copolymers polymerized therefrom. As such, a copolymer precipitates from the reaction mixture phase as it is formed. Suitable phase-separating diluents are organic solvents which are substantially inert with respect to the suspending medium, monomers, and resulting copolymer. Generally, organic solvents having boiling points of at least about 60° C. are suitable and include aliphatic hydrocarbons, organic acids, aliphatic alcohols or mixtures thereof. Examples of suitable diluents are hexane, heptane, iso-octane, tert-amyl alcohol, n-butanol, sec-butanol, 2-ethyl-hexanol, and decanol. Other phase-separating diluents are described in U.S. Pat. Nos. 4,224,415 and 3,276,482. The choice of diluent will depend on the particular monomers being polymerized, as previously discussed, and on the temperature at which one plans to conduct the polymerization reaction. The amount of diluent used can also vary depending on the type and proportion of monomers employed, but generally an adequate amount will be from about 20 to about 50 weight percent, based on the total weight of reaction mixture.

In a typical process, the seed beads, which comprise from about 5 to about 40 weight percent of the copolymer bead product, are suspended within a continuous suspending medium, The monomer mixture containing a free-radical initiator is then added to the suspended seed beads, into which it is imbibed. Although less preferred, the seed beads can be imbibed with the monomer mixture prior to being suspended in the continuous suspending medium. The suspending medium is usually water and the suspending agent a suspension stabilizer, e.g., gelatin, polyvinyl alcohol or a cellulosic such as hydroxyethyl cellulose, methyl cellulose or carboxymethyl methyl cellulose. The monomer mixture may be added in one portion or in stages. The monomer mixture is preferably imbibed by the seed beads under conditions such that little or no polymerization occurs. The time required to imbibe the monomers will vary depending on the copolymer seed composition and the monomers imbibed therein. However, the extent of imbibition can generally be determined by microscopic examination of the seed beads.

Once the monomer mixture has been imbibed into the polymer seed beads, a polymer matrix of a first copolymer (from seed beads) and a second copolymer (from imbibed monomer mixture) is formed by the free-radical polymerization of the monomer mixture within the seed beads. As in typical suspension polymerizations, the organic phase is suspended in the agitated aqueous medium.

Generally, the suspending medium is employed in an amount of from 35 to 70 weight percent, preferably from 35 to 50 weight percent based on the total weight of the components charged to the reactor. The polymerization is conducted at a temperature from between 50° and 210° C., preferably from between 70° and 170° C.

Optionally, the polymer matrix may additionally contain a third copolymer. The third copolymer is added to the matrix as follows. When polymerization of the reaction mixture imbibed in the polymer seed is at least 20 percent and up to about 95 percent complete, the polymer matrix is imbibed further with a second monomer mixture having a third monovinyl aromatic monomer and a third polyvinyl aromatic monomer.

The third monovinyl aromatic monomers suitable for addition to the polymer matrix include styrene, alkylstyrenes such as vinyltoluene and ethyl vinylbenzene, vinylbenzyl chloride, vinyl naphthalene or mixtures thereof. Styrene, ethyl vinylbenzene or mixtures thereof are preferred.

The third polyvinyl aromatic monomers suitable for addition to the polymer matrix include divinylbenzene, divinyltoluene, divinylnaphthalene, trivinylbenzene, divinyl diphenyl ether and the like, with divinylbenzene being preferred.

The second monomer mixture with which the polymer matrix is imbibed generally contains from about 0 to about 20, preferably from 0.1 to 5 weight percent of the third polyvinyl aromatic monomer based on the total weight of the second monomer mixture, with the balance being the third monovinyl aromatic monomer.

The second monomer mixture is preferably added continuously to the suspension of the polymer matrix under conditions including a temperature sufficient to initiate free-radical polymerization of the monomers in the second monomer mixture. As the second monomer mixture is imbibed into the polymer matrix, polymerization is preferably initiated by the residual free-radicals already present from the first monomer mixture imbibed into the original seed beads. Thus, the third copolymer in the matrix is formed preferably without the addition of further initiator to the second monomer mixture. U.S. Pat. Nos. 4,419,245, 4,564,644 and 5,231,115 provide detailed descriptions of a variety of processes for the preparation of polymer matrices useful in the practice of this invention.

Crosslinked seeded copolymer beads refers to beads which are made by a multistage process and in which the copolymers resulting from each stage of the process are linked together. The crosslinking of the copolymers which comprise the polymer matrix is the gist of the present invention. This essential step is achieved by a variety of methods including, for example, the following: (a) incorporation of a crosslinkable moiety into the first copolymer (seed bead) followed by activation of that moiety during the formation of the second copolymer, (b) formation of sulfone bridges between the copolymers of the polymer matrix, and (c) formation of alkylene bridges between the copolymers of the polymer matrix.

In one method of crosslinking, a crosslinkable monovinyl aromatic monomer, such as vinylbenzocyclobutene (VBCB), is incorporated into the seed bead by typical suspension polymerization techniques. The crosslinkable monovinyl aromatic monomer comprises from about 1 to about 20 and more preferably from 2 to 10 weight percent of the combined total of the first monovinyl aromatic monomer and the first polyvinyl aromatic monomer. Care is taken to maintain the temperature of the suspension polymerization which prepares the seed beads below 150° C. so as not to activate the crosslinkable benzocyclobutene function at this stage. After the seed beads have been imbibed with the monomer mixture of a second monovinyl aromatic monomer, a second polyvinyl aromatic monomer and a higher-temperature free-radical initiator, e.g., cumene hydroperoxide, the reaction mixture is heated to about 160° to about 210° C. activating the benzocyclobutene moieties in the first copolymer to combine with some of the second polyvinyl aromatic monomer which then is incorporated into the second copolymer effectively crosslinking it to the first copolymer. The higher-temperature free-radical initiator should be effective within this temperature range so that polymerization of the mixture of the second monovinyl aromatic monomer and the second polyvinyl aromatic monomer is not too well advanced to prevent efficient crosslinking via reaction of the benzocyclobutene with the vinyl group of the second polyvinyl aromatic monomer. Such procedures are described in U.S. Pat. Nos. 4,698,394 and 4,708,994.

In another method of crosslinking, the copolymers of the polymer matrix are bridged with alkylene groups. After formation of the second copolymer, the polymer matrix is swollen with an inert solvent. A variety of solvents and solvent mixtures may be used for this purpose including aliphatic hydrocarbons and chlorinated hydrocarbons. Ethylene dichloride is the preferred solvent. While the polymer matrix is in the swollen state, a crosslinking agent and an effective amount of a Friedel-Crafts catalyst are added and the mixture is heated for a sufficient time and temperature to effect crosslinking. Suitable crosslinking agents are polyfunctional alkylating and acylating agents and include, for example, the following: $\alpha,\alpha'$-dichloro-p-xylene, chloromethyl methyl ether, bis(chloromethyl) ether, and terephthaloyl chloride. The preferred crosslinking agent is chloromethyl methyl ether which provides methylene bridging between aromatic rings. Usually, from 1 to 20 equivalents of crosslinking agent per available aromatic ring are employed. Any Friedel-Crafts catalyst may be used to catalyze the reaction, but acidic metal halides, particularly the chlorides, of aluminum, tin and iron are most preferred. Effective amounts of catalyst range from about 0.1 to about 50 and preferably from 1 to 30 percent based on the weight of the polymer matrix. Temperatures of about 40° to about 100° C. are sufficient to effect crosslinking between the copolymers of the polymer matrix. Exemplary procedures for alkylene bridging are set forth in U.S. Pat. Nos. 4,263,407 and 4,950,332.

Methylene bridging may also be accomplished by incorporating vinylbenzyl chloride either into the seed bead or into the monomer mixture with which the seed bead is imbibed. The pendent chloromethyl groups can then be crosslinked by the appropriate treatment in the presence of a Friedel-Crafts catalyst as described above.

In yet another method of crosslinking, the copolymers of the polymer matrix are bridged with sulfone groups. While some sulfone bridging occurs during the routine functionalization of polymer beads into cation-exchange resins under standard sulfonation conditions, sulfone bridging must be maximized for the purposes of this invention. U.S. Pat. No. 4,177,331 describes various methods to increase the amount of sulfone crosslinking during the sulfonation of linear polystyrene beads. These same methods apply to the successful crosslinking of the copolymers of the polymer matrix during functionalization into cation-exchange resins.

Particular combinations of sulfonating agents are most useful for increasing crosslinking via sulfone bridge formation, e.g., sulfur trioxide—sulfuric acid, chlorosulfonic acid—sulfur trioxide, chlorosulfonic acid—sulfuric acid, chlorosulfonic acid—sulfur trioxide—boron compound, chlorosulfonic acid—sulfuric acid—boron compound, and sulfur trioxide—sulfuric acid—boron compound. Preferred boron compounds are boric acid and boron oxide. Effective amounts of boron compound range from about 0.01 to about 5.0 percent based on the weight of the sulfonating agent used. Other factors, such as temperature, time, use of swelling solvent and ratio of sulfonating acid to substrate, have a much less significant affect on sulfone bridge formation. Therefore, other than the use of a particular sulfonating agent, sulfonations are run under typical sulfonating conditions; see, for example, U.S. Pat. Nos. 3,266,007; 2,500,149; 2,631,127; 2,664,801; and 2,764,564. Thus, the weight ratio of sulfonating agent to beads is generally from about 2:1 to about 16:1. Suitable temperatures range from about 0° to about 150° C. Sulfonations can be conducted in the presence of a swelling agent, such as methylene chloride, ethylene dichloride or sulfur dioxide.

Seeded copolymer beads crosslinked either by activation of crosslinkable monomers incorporated into the polymeric seed or by alkylene-bridge formation can similarly be functionalized to cation-exchange resins either by routine sulfonation procedures using conventional sulfonating agents or by the special procedures described above which foster enhanced sulfone bridging.

The invention is further illustrated by the following examples.

EXAMPLE I

Seeded Copolymer Crosslinked Through Activation of Crosslinkable Monomer Incorporated into Polymer Seed Beads

A. Synthesis of Seed Beads

At room temperature, an organic monomer mixture was prepared by mixing styrene (STY), 55 percent divinylbenzene (DVB) and vinylbenzocyclobutene (VBCB) with the initiators t-butyl peroctoate (t-BPO; 50 percent) and t-butyl perbenzoate (t-BPB). Similarly, an aqueous suspending medium was prepared by mixing water, sodium dichromate and 1 percent carboxymethyl methylcellulose (CMMC). Both mixtures were poured into a 2 liter (L) stainless steel reactor which was then purged 3 times with nitrogen and sealed. The mixture was stirred at 300 revolutions per minute (rpm) at room temperature for 30 minutes (min) to size the suspension. The stirring rate was reduced to 200 rpm and the reaction mixture was warmed to 75° C. at 0.5° C./min, held at 75° C. for 12 hours (hr), warmed to 95° C. for 1.5 hr and warmed to 110° C. for 1.5 hr. After cooling to room temperature, the reactor was opened and the contents were collected by filtration and washed 3 times with deionized water. The beads were dried and screened to remove large polymer chunks. The results of a series of experiments using varying amounts of VBCB are reported in Table IA.

TABLE IA

Synthesis of Polymer Seed Beads Containing Varying Amounts of Vinylbenzoeyclobutene (VBCB)

| Ingredient | 2% VBCB | 4% VBCB | 8% VBCB |
|---|---|---|---|
| STY (g) | 487.2 | 477.4 | 456.2 |
| 55% DVB (g) | 2.7 | 2.7 | 2.7 |
| VBCB (g) | 10.0 | 20.0 | 40.0 |
| t-BPO (g) | 2.72 | 2.72 | 2.72 |
| t-BPB (g) | 0.25 | 0.22 | 0.22 |
| 1% CMMC (g) | 200.1 | 199.9 | 200.0 |
| water (g) | 800.1 | 806.2 | 806.0 |
| 60% $Na_2Cr_2O_7$ | 3.0 | 3.0 | 3.4 |

B. Synthesis of Crosslinked Seeded Polymer Beads

The polymer seed beads prepared in IA were combined with water and were shaken well to wet the beads. STY and 55 percent DVB and 78 percent cumene hydroperoxide (CHP) were added to the seed slurry which was shaken for 90 min to allow the seeds to imbibe the mixture of monomers and initiator. Aqueous solutions of CMMC and $Na_2Cr_2O_7$ were added and the suspension was shaken until agglomerations were broken. The slurry was charged into a high-pressure 920 milliliter (mL) Parr reactor which was sealed and agitated at 250 rpm. The reaction mixture was warmed to 175° C. at 2.5° C./min and held at 175° C. for 5 hr. After cooling to room temperature, the reactor was opened and the contents were collected by filtration and washed 3 times with deionized water. The beads were dried and screened to remove large polymer beads. The results of a series of experiments using seed beads of varying amounts of VBCB are summarized in Table IB.

TABLE IB

Synthesis of Crosslinked Seeded Copolymer Beads Derived from Seed Beads Containing Varying Amounts of VBCB

| Ingredient | 2% VBCB | 4% DBCB | 8% DBCB |
|---|---|---|---|
| seed (g) | 83.5 | 83.5 | 83.6 |
| STY (g) | 136.2 | 136.2 | 136.2 |
| 55% DVB (g) | 30.3 | 38.8 | 30.2 |
| 78% CHP (g) | 1.1 | 1.1 | 1.1 |
| 1% CMMC (g) | 100.0 | 100.2 | 99.6 |
| water (g) | 402.7 | 400.2 | 401.4 |
| 60% $Na_2Cr_2O_7$ (g) | 1.8 | 1.8 | 1.9 |

C. Synthesis of Cation-Exchange Resin by Sulfonation of Crosslinked Seeded Polymer Beads Crosslinked seeded polymer beads (50 g) prepared in IB were mixed with 500 g of 99 percent sulfuric acid and 15 mL of methylene chloride and allowed to swell for 30 min. The reaction mixture was then heated to 120° C. for 2 hr under constant agitation. After cooling to room temperature, the resin was hydrolyzed by washing with a series of progressively more dilute aqueous sulfuric acid solutions until the resin was washed just with water.

To determine the oxidative stability of the seeded cation-exchange resins having different degrees of crosslinking, the samples were analyzed as follows: One part (vol.) of cation-exchange resin was thoroughly washed with 3 parts of 18 percent hydrochloric acid and then rinsed with 20 parts of water. Excess water was removed from the resin by filtration and the resin was stored damp. One part of damp resin was sealed in a fluorocarbon bottle with one part of 30 percent hydrogen peroxide and heated at 60° C. for 24 hr. After cooling to room temperature with an ice bath, the hydrogen peroxide was removed by vacuum filtration and the resin was rinsed with 4 parts of deionized water in 2 equal portions on the filter and then backwashed with 24 parts of water in a column. Excess water was removed on 1 part damp resin and 1 part ultrapure water were digested in a clean fluorocarbon bottle with stirring for 24 hr at 60° C. A portion of the water (~50 mL) was decanted from the resin and analyzed for leachables. Total organic carbon (TOC) levels were measured using an O.I. Corporation Model 700 Carbon Analyzer. Leachables were also analyzed by size-exclusion chromatography to determine molecular weight distribution relative to sodium polystyrene sulfonate standards. Samples were eluted from a pair of 3.9 mm×300 mm μ-Bondagel E-125 and E-500 columns (Waters Associates) arranged in series using 25 mM $NaH_2PO_4$ in 10 percent $CH_3CN$. The amounts of leachables having molecular weights greater than 1000 g/mol, which is indicative of oxidative instability, are reported in Table IC for cation-exchange resins made from crosslinked seeded polymer beads with different levels of VBCB crosslinking.

TABLE IC

Leachable Levels After Sulfonation of Crosslinked Seeded Polymer Beads

| % DVB in deed | % VBCB in seed | % DVB in bead | TOC ppm MW>1000 |
|---|---|---|---|
| 0.3 | 2 | 6.8 | 450 |
| 0.3 | 4 | 8.4 | 89 |
| 0.3 | 8 | 6.6 | 67 |

EXAMPLE II

Seeded Cation-Exchange Resins Crosslinked by Sulfone-Bridge Formation

A. Synthesis of Seed Beads

At room temperature an organic monomer mixture was prepared by mixing 165 parts of styrene, 1 part of 55% divinylbenzene, 0.9 parts of 50 percent t-butylperoctoate and 0.08 parts of t-butylperbenzoate. Similarly, an aqueous suspending medium was prepared by mixing 224.5 parts of water, 0.44 parts of sodium dichromate and 0.44 parts of carboxymethyl methylcellulose. The aqueous mixture was pumped into a stainless steel reactor. The monomer mixture was sized externally to the reactor. The uniform sized monomer droplets rose into the reactor. Once full, the reaction mixture was warmed to 75° C. over 1.5 hr, held at 75° C. for 12 hr, warmed to 95° C. for 1.5 hr and warmed to 110° C. for 1.5 hr. After cooling to room temperature, the reactor was opened and the contents were collected by filtration and washed 3 times with deionized water. The beads were dried and screened to remove large polymer chunks.

B. Synthesis of Seeded Copolymer Beads

The polymer seed beads (320 parts) prepared in IIA were combined with 1340 parts of water and were agitated to wet the beads. Styrene (347 parts), 55% divinylbenzene (50 parts), t-butyl-peroctoate (0.74 parts) and t-butylperbenzoate (0.56 parts) were added to the seed slurry which was agitated for 90 min to allow the seeds to imbibe the mixture of monomers and initiators. Gelatin (3.6 parts) and sodium dichromate (5.8 parts) were added to the suspension which was stirred until any agglomerations were broken. The slurry was charged into a reactor and the reaction mixture was heated to 78° C. for 10 hr. During the 10 hr period, a monomer mixture (835 parts styrene and 48 parts 55% divinylbenzene) was added at a rate of 2.8 parts/min. After the continuous addition was complete, the temperature was maintained at 78° C. for 3 hr and then raised to 110° C. for 2 hr. After cooling, the beads were collected by filtration, washed with water, dried and screened.

C. Synthesis of Seeded Cation-Exchange Resin by Crosslinking Via Sulfone-Bridge Formation during Sulfonation In a clean and dry 3-necked flask equipped with a Teflon™ paddle stirrer, dropping funnel and bottom valve was charged the appropriate amount of sulfuric acid. Agitation was commenced and either oleum and/or boric acid or boron oxide were dissolved in the sulfuric acid. Seeded copolymer beads from IIC were added to the reactor. If employed, a swelling agent was added to the reaction mixture and the copolymer beads were allowed to swell at room temperature. If employed, chlorosulfonic acid was added dropwise to the reaction mixture at a rate slow enough to prevent the violent evolution of HCl. The reaction mixture was heated at the prescribed temperature for the appropriate amount of time. The reaction mixture was cooled to below 40° C. and the resin was gradually hydrated by washing with increasingly dilute aqueous sulfuric acid solutions until the resin was washed just with water.

While the exact extent of sulfone bridging is difficult to quantify, the presence of sulfone bridging can be detected and estimated by comparing proton nuclear magnetic resonance spectra of aqueous bead slurries or by comparing dry weight capacities (DWC) found with those calculated on the basis of the weight percent sulfur of the resin. As in Example IC, oxidative stability and amount of crosslinking can be correlated with the amount of organic carbon of molecular weight greater than 1000 g/mol leached from the cation-exchange resin, i.e., lower levels of leachable carbon are associated with increased amounts of sulfone bridging. The details of the sulfonation conditions and the properties of the resulting cation-exchange resins are summarized in Table II.

TABLE II

| | Sulfonation Conditions And Resin Properties | | | | | |
|---|---|---|---|---|---|---|
| | Control | Oleum/Cat. | Oleum/Cat. | Oleum/Cat/Sol | HSO$_3$Cl | HSO$_3$Cl/Cat. |
| H$_2$SO$_4$, mL | 250 | 125 | 125 | 88 | 200 | 200 |
| ClSO$_3$H, mL | | | | | 55 | 50 |
| 30% Oleum, mL | | 125 | 125 | 188* | | |
| H$_3$BO$_3$, gm | | 10 | 10 | | | |
| B$_2$O$_3$, gm | | | | 10 | | 10 |
| Copolymer, gm | 56 | 56 | 56 | 56 | 56 | 56 |
| MeCl$_2$, mL | 19 | | | 19 | | |
| Swell Time, min. | 30 | | | 30 | | |
| Ramp Time, min. | 45 | 45 | 60 | 60 | 60 | 60 |
| Temp. 1, °C. | 115 | 80 | 120 | 116 | 60 | 110 |
| Time 1, hr. | 2 | 3 | 1 | 1.5 | 1 | 1.5 |
| Temp. 2, °C. | | 100 | | | 90 | 120 |
| Time 2, hr. | | 1.5 | | | 1 | 1 |
| Temp. 3, °C. | | 120 | | | 110 | |
| Time 3, hr. | | 2 | | | 1 | |
| TOC >1000 MW ppm | 1707 | 216 | 129 | 123 | 316 | 477 |
| DWC, meq/gm | 5.48 | 5.58 | 5.51 | 5.37 | 5.72 | 5.58 |

*21% oleum

What is claimed is:

1. Seeded polymer beads comprising (a) a first copolymer comprised of a first monovinyl aromatic monomer and a first polyvinyl aromatic monomer wherein the concentration of the polyvinyl aromatic monomer is less than 3 weight percent of the total monomer in the first copolymer, and (b) a second copolymer comprised of a second monovinyl aromatic monomer and a second polyvinyl aromatic monomer, the first copolymer being crosslinked to the second copolymer.

2. The seeded polymer beads of claim 1 in which the first monovinyl aromatic monomer is styrene, ethyl vinylbenzene, vinyl benzocyclobutene or mixtures thereof; the second monovinyl aromatic monomer is styrene, ethyl vinylbenzene or mixtures thereof; and the first and second polyvinyl aromatic monomers are divinylbenzene.

3. The seeded polymer beads of claim 2 in which the first copolymer is crosslinked to the second copolymer by incorporating vinylbenzocyclobutene into the first copolymer and by heating to effect crosslinking during the formation of the second copolymer.

4. The seeded polymer beads of claim 2 in which the first copolymer is crosslinked to the second copolymer by alkylene bridging.

5. A seeded cation-exchange resin prepared from the seeded polymer beads of claim 1.

6. The seeded cation-exchange resin of claim 5 in which the leachability of organic carbon fragments of molecular weight greater than 1000 g/mol is less than 800 ppm.

7. A seeded cation-exchange resin comprising (a) a first copolymer comprised of a first monovinyl aromatic monomer and a first polyvinyl aromatic monomer wherein the concentration of the polyvinyl aromatic monomer is less than 3 weight percent of the total monomer in the first copolymer, and (b) a second copolymer comprised of a second monovinyl aromatic monomer and a second polyvinyl aromatic monomer, the first copolymer being crosslinked to the second copolymer by sulfone bridges.

8. The seeded cation-exchange resin of claim 7 in which the monovinyl aromatic monomers are styrene, ethyl vinylbenzene or mixtures thereof, and the polyvinyl aromatic monomers are divinylbenzene.

9. The seeded cation-exchange resin of claim 7 in which the leachability of organic carbon fragments of molecular weight greater than 1000 g/mol is less than 800 ppm.

10. A seeded cation-exchange resin prepared from the seeded polymer beads of claim 3.

11. A seeded cation-exchange resin prepared from the seeded polymer beads of claim 4.

* * * * *